US010303305B2

United States Patent
Cable et al.

(10) Patent No.: US 10,303,305 B2
(45) Date of Patent: May 28, 2019

(54) SCANNING TOUCH SYSTEMS

(71) Applicant: Light Blue Optics Ltd, Cambridge (GB)

(72) Inventors: Adrian James Cable, Cambridge (GB); Paul Richard Routley, Cambridge (GB); Euan Christopher Smith, Longstanton (GB); Gareth John McCaughan, Cottenham (GB); Peter William Tudor Mash, Cambridge (GB)

(73) Assignee: Light Blue Optics Ltd., Cambridge (GB)

( * ) Notice: Subject to any disclaimer, the term of this patent is extended or adjusted under 35 U.S.C. 154(b) by 551 days.

(21) Appl. No.: 14/421,391

(22) PCT Filed: Aug. 13, 2013

(86) PCT No.: PCT/GB2013/052150
§ 371 (c)(1),
(2) Date: Feb. 12, 2015

(87) PCT Pub. No.: WO2014/027189
PCT Pub. Date: Feb. 20, 2014

(65) Prior Publication Data
US 2015/0212653 A1    Jul. 30, 2015

(30) Foreign Application Priority Data
Aug. 14, 2012    (GB) .................................... 1214465.5

(51) Int. Cl.
*G06F 3/042*    (2006.01)
(52) U.S. Cl.
CPC .......... *G06F 3/0423* (2013.01); *G06F 3/0421* (2013.01); *G06F 3/0426* (2013.01); *G06F 3/0428* (2013.01)

(58) Field of Classification Search
CPC .... G06F 3/0423; G06F 3/0426; G06F 3/0421; G06F 3/0428
See application file for complete search history.

(56) References Cited

U.S. PATENT DOCUMENTS 5,024,529 A * 6/1991 Svetkoff ................ G01B 11/02
                                                          356/3.04
6,480,187 B1   11/2002 Sano et al.
(Continued)

FOREIGN PATENT DOCUMENTS

DE    102006032562    2/2007
EP      1132852       9/2001

OTHER PUBLICATIONS

English translation of DE 102006032562, published on Aug. 2, 2007, inventor WalterScherhag.*

*Primary Examiner* — William Boddie
*Assistant Examiner* — Saifeldin E Elnafia
(74) *Attorney, Agent, or Firm* — Hamilton, DeSanctis & Cha

(57) ABSTRACT

Various approaches to touch sensing systems are disclosed As an example, a touch sensing system is disclosed that includes: an optical beam source to provide an optical beam; a pair of controllable beam deflectors comprising at least first and second beam deflectors, wherein the first beam deflector is configured to deflect the optical beam through a first angle towards a touch sensing region, and wherein the second beam deflector is configured to deflect scattered light from an object in the touch sensing region through a second angle; a detector, in particular a detector array; and an imaging system to image the deflected scattered light from the second beam deflector onto the detector array. The first and second beam deflectors are controlled in tandem to scan the touch sensing region.

21 Claims, 7 Drawing Sheets

(56) References Cited

U.S. PATENT DOCUMENTS

| | | |
|---|---|---|
| 7,359,041 B2 | 4/2008 | Xie et al. |
| 8,373,678 B2 | 2/2013 | Yamada |
| 2005/0224582 A1 | 10/2005 | Aiki et al. |
| 2009/0091553 A1 | 4/2009 | Keam et al. |
| 2010/0207876 A1* | 8/2010 | Lin ................... G06F 3/0423 345/156 |
| 2011/0181553 A1* | 7/2011 | Brown ................ G06F 3/0425 345/175 |
| 2012/0146954 A1 | 6/2012 | Park et al. |

* cited by examiner

SCANNING TOUCH SYSTEMS

CROSS REFERENCE TO RELATED APPLICATION

This application claims priority to GB Application No. GB1214465.5 entitled "Scanning Touch Sensing Systems" and filed Aug. 14, 2012 and PCT Application PCT/GB2013/052150 filed Aug. 13, 2013. The entirety of the aforementioned applications are incorporated herein by reference for all purposes.

FIELD OF THE INVENTION

This invention relates touch sensing systems and methods which, in embodiments, can be used to provide a virtual touch sensing surface just above a display screen, white board or the like.

BACKGROUND OF THE INVENTION

We have previously described touch sensing systems employing a plane or sheet of light, for example as shown in FIGS. 1 and 2. These techniques may be employed for detecting touches or proximate to a surface.

FIG. 1 shows an example touch sensitive image projection device 100 comprising an image projection module 200 and a touch sensing system 250, 258, 260 in a housing 102. A proximity sensor 104 may be employed to selectively power-up the device on detection of proximity of a user to the device. The image projection module 200 is configured to project downwards and outwards onto a flat surface such as a tabletop; boundaries of the light forming the displayed image 150 are indicated by lines 150a, b. The touch sensing system 250, 258, 260 comprises an infrared laser illumination system 250 configured to project a sheet of infrared light 256 just above the surface of the displayed image 150 (for example ~1 mm above, although in principle the displayed image could be distant from the touch sensing surface). The laser illumination system 250 may comprise an IR LED or laser 252, collimated then expanded in one direction by light sheet optics 254 such as a cylindrical lens. A CMOS imaging sensor (touch camera) 260 is provided with an IR-pass lens 258 and captures light scattered by touching the displayed image 150, with an object such as a finger, through the sheet of infrared light 256 (the boundaries of the CMOS imaging sensor field of view are indicated by lines 257, 257a, b). The touch camera 260 provides an output to touch detect signal processing circuitry as described further later. These techniques may be employed with any type of image projection system.

FIG. 2, this shows plan and side views of an example interactive whiteboard touch sensitive image display device 400 incorporating such a system. In the illustrated example there are three IR fan sources 402, 404, 406, each providing a respective light fan 402a, 404a, 406a spanning approximately 120° together defining a single, continuous sheet of light just above display area 410. The fans overlap on the display area (which is economical as shadowing is most likely in the central region of the display area). Typically such a display area 410 may be of order 1 m by 2 m. The side view of the system illustrates a combined projector 420 and touch image capture camera 422 either aligned side-by-side or sharing a portion of the projection optics. The optical path between the projector/camera and display area is folded by a mirror 424. In some cases, the sheet of light generated by fans 402a, 404a, 406a is close to the display area, for example less than 1 cm or 0.5 cm above the display area. However the camera and projector 422, 420 are supported on a support 450 and may project light from a distance of up to around 0.5 m from the display area.

There is, however, a desire for alternative/improved techniques. For example, in particular for large LCD display screens, it would be advantageous to be able to provide touch detection from a relatively low height above the display surface, for example less than 1 cm rather than by employing a camera looking down on the display surface. It is also desirable to reduce cost and improve the user experience, for example by improving the 'refresh rate' and reducing the noise.

One type of touch detection is described in US2009/0091553, in which a laser is raster scanned across a display from behind, beneath the display surface. Another typical scanning-type touch panel is described in US2001/0028344, employing a polygonal mirror to angularly scan laser light for touch detection. The system uses light scanned over the surface of a display screen and employs scanning angle/timing for touch detection but provides no distance information along the scanned beam, in a direction perpendicular to the sweep.

It is desirable to improve upon these known techniques.

SUMMARY OF THE INVENTION

In some embodiments, a touch sensing system is provided that includes: an optical beam source to provide an optical beam; a pair of controllable beam deflectors comprising at least first and second beam deflectors, wherein said first beam deflector is configured to deflect said optical beam through a first angle towards a touch sensing region, and wherein said second beam deflector is configured to deflect scattered light from an object in said touch sensing region through a second angle; a detector, in embodiments a detector array; and an imaging system to image said deflected scattered light from said second beam deflector onto said detector (array); wherein said first and second beam deflectors are controlled in tandem to scan said touch sensing region.

Broadly speaking, it has been discovered that with a rotating polygonal mirror, rather than use one face to both send and return light from a touch object, a second face may be employed to view the touch object from slightly off to one side, and viewing the beam from one side rather than along the beam allows the object distance to be estimated (more accurately nearer than farther because of the relatively small lateral displacement).

Furthermore the inventors have recognized that this concept may be generalized so that rather than employing a polygonal mirror, a matched or phase locked pair of beam deflectors of other types may alternatively be employed, for example MEMS (micro electro mechanical system) deflectors.

In principle the second deflector is not needed since the object-illuminating beam may still be viewed from slightly off to one side, but in a scanned system the rotating nature of the scanning beam would require a very long detector. Thus employing a second beam detector controlled in tandem with the first to provide complementary deflection enables the detector array length to be reduced to a manageable size. The second beam deflector scans in the same direction as the first beam deflector, at the same time, but is not required to provide the same deflection (although in embodiments, it does). In general, however, there is always a fixed angle between the two deflectors (mirror facets), at least in one plane, more particularly a plane perpendicular to the axis of scanning (or of rotation of the polygonal mirror). Where a polygonal mirror is employed, the facets providing the first and second beam deflectors, this defines a fixed angle between the mirror facets. Where the beam deflectors comprise MEMS deflectors they may be synchronized, for example, by synchronizing phase locked loop driver circuits for the MEMS deflectors.

In some embodiments of the system a detector array is employed, the longitudinal position of the (imaged) scattered light along the array correlating with the distance to the touch object. This may be used, for example by a signal processor, to determine the (approximate) distance to the touch object.

In other embodiments, however, a single detector may be employed to distinguish between touches at different distances, for example positioning the detector at a particular location to selectively detect a touch in a particular, corresponding, distance range. More particularly, however, a single detector may be employed to distinguish a genuine touch event from a background signal. In such embodiments the detector is not used to determine the location of the touch in 2D—that may be done, for example, by triangulation using multiple touch sensing systems—but is employed to distinguish a nearby touch from a distant background reflection. In such embodiments the single detector is displaced away from a location at which light from infinity is imaged, for example away from a center of the image field. Then, a signal from this detector confirms that the touch event is genuine rather than from some distant background.

In general the touch sensing region will define one or more planes, but in principle this region may have other shapes. In embodiments the touch sensing region defines a plane a short distance away from an interactive physical surface, for example the surface of an interactive white board or electronic display. Thus the touch sensing region may define a touch surface in space (a 'virtual' touch surface), and where employed to provide an interactive physical surface this touch surface may be, for example, located within 1 cm or less of the physical surface. In such a case, if the physical surface is for example slightly bowed, a small correction mirror may be moved up and down in front of the first beam deflector as the beam is scanned and thereby define a touch surface approximating the surface of a frustrocone in embodiments, as described in more detail later, the touch sensing region may comprise multiple touch sensitive planes (or other surfaces) to define a three dimensional touch sensing region.

In embodiments the second beam deflector is laterally displaced from the first beam deflector, but the lateral displacement may be small in order that the touch sensing system is small. In this case the distance information may be relatively inaccurate, the inaccuracy increasing with increasing distance from the beam deflectors. Thus in embodiments the system provides only an approximate value for the distance of the touch object, and this distance may be accompanied by error, standard deviation or other probability data defining a degree of accuracy of the distance determination (the error being larger with increasing distance).

Nonetheless embodiments of the system can be of great utility, in particular for multitouch detection. With multitouch detection two (or more) embodiments of the system may be employed to provide accurate object angle data, which can be used to determine an object position by triangulation. However with multitouch detection it can be problematic to link a set of angles from one touch detector with the corresponding angles for the same touch objects from another touch detector because there is ambiguity in the data (two different configurations of multitouch pattern can give rise to the same sets of angular data from the sensors). In embodiments the distance information, albeit approximate, can be employed to disambiguate the angular touch data. More particularly the distance information can be used to determine which sets of angular measurements should be paired to identify corresponding touch objects seen by the respective sensors.

As previously mentioned, the length of the scanning beam extending away from the polygonal mirror/deflection device is effectively imaged onto the detector (photodiode) array. Thus some portions of the imaged beam are closer to the array than others and because of this will have a respective focus at different distances from the imaging system (lens(s), mirror(s) or other elements). To address this, in embodiments the detector array is tilted at an acute angle to the optical axis of the imaging system to compensate for the different focal positions of objects of different distances. Nonetheless, embodiments of the imaging system need not produce a precisely focused image of the scattered light from an object on the detector array and there can be advantages in deliberately defocusing the light on the detector array. The array may have, for example, 10-500 detector elements, but the number of elements can be reduced, for example down to less than 100, 50 or 20, by defocusing the image of the object on the array and then interpolating over a plurality of detector elements to determine the location of a centroid of the imaged light. In this way the system can effectively interpolate between a relatively few elements. The defocusing can be achieved by simply moving the photodiode array so that it is not precisely at a focal position, but in embodiments it can be desirable to introduce a diffuser such as a thick diffusing film, or other angular spreading element, between the imaging system and the detector array.

Since distances further from the polygonal mirror/scanning device are effectively compressed because of perspective, in embodiments it can be useful to include optics, for example in the imaging system, to correct for this. The vanishing point for and object along the scanning beam is, in embodiments, in the center of the image field and thus some perspective correction can be provided by employing a field flattening optical element to preferentially magnify regions of the image field close to the optical axis. In embodiments the magnification of this element or elements has a value which, for a range of distances from the optical axis, is inversely proportional to distance from the optical axis. However this provides only partial correction and, in addition, larger object distances will still have greater tolerance/error than shorter object distances.

In some embodiments the system may be arranged to project two (or more) planes of light at different angles to extend the touch sensing region into a third dimension perpendicular to the touch plane. In a system with a polygonal mirror this may be achieved by providing a wedge or other optical deflector on pairs of adjacent mirrors (facets) so that as the mirror rotates the scanning beam is directed up (or down) at an angle and the imaging system is arranged by the corresponding wedge on the facet capturing light for the imaging system, to look in a direction tilted upwards (or downwards) along the scanning beam. However it is not essential that the imaging system looks precisely along the scanning beam as, in general, the detector array will have a viewing angle perpendicular to the scanning plane which may be sufficient to encompass small tilts of this plane up and/or down. Thus in a system with a polygonal mirror, as the mirror rotates there will be times when one scanning or imaging facet has a beam-tilting wedge and the other does not—but nonetheless useful signals can still be obtained at these times. Additionally or alternatively the detector array may be extended perpendicularly to its longitudinal direction and/or a two dimensional array may be employed to provide some additional field of view in a Z-direction perpendicular to the plane/parallel to the scanning axis.

A similar approach may be employed in a system with MEMS beam deflectors, when one or both deflectors may be arranged to tilt the scanning beam out of a plane perpendicular to the scanning axis.

Each of these approaches provides additional touch functionality, for example to detect degree and/or speed of approach, gestures and the like.

Embodiments of the systems include a signal processor to output data defining a location of one or more touch objects in two or three dimensions. In a multi touch system the signal processor may be shared amongst the touch systems and may also use angular information for triangulation to locate touches and use distance information for touch disambiguation as previously described.

In embodiments the signal processor is coupled to the detector (photodiode) array to receive an imaging signal and, from this, to determine an approximate distance to a touch object. This is described in more detail later. Embodiments of the signal processor also receive a timing signal input for a timing signal defining a fiducial position of a beam deflector. This can be used to determine the azimuthal angle of the scanning beam, together the distance and azimuth angle defining the location of a touch object in polar coordinates relative to the touch sensor. Optionally this may be converted to rectangular (or other) coordinates. The timing signal defining the position of a beam deflector may be obtained from the drive electronics of a MEMS beam deflector or in the case of a polygonal mirror, from a detector such as a photodiode positioned to intersect the scanning beam at one edge of the touch sensitive region. Where multiple touch surfaces are defined by deflecting the scanning beam in the Z-direction the same or another photo detector may be employed to define the reference position of the scanning beam (since the tilt angle will in general be known).

In a multitouch system similar signal processing may be employed by one touch sensing system to determine the location(s) of one or more other touch sensing system(s) and the touch sensing systems may then communicate with one another and/or a central controller so that the relative positions of the set of touch sensing systems are known to the system. This enables the system to be self-calibrating/self-learning. Optionally a touch sensing system may be provided with a retro reflector to facilitate such a procedure. In principle such an approach may be employed with any type of touch sensing system which is able remotely to determine the location of one or more touch objects.

In embodiments the touch sensing system may be provided with a power and/or safety control system to reduce an average optical output from the laser when a speed of the scanning is reduced. Thus, for example, the system may default to only switching the laser on, or up to its usual operating power, when scanning at full operating speed.

In embodiments the touch sensing system pulses the optical beam on and off during the scanning process, for example between successive mirror facets, to determine a background level of illumination which may then be subtracted from the signal, when scanning, for improved performance.

In a related aspect the invention provides a method of determining the location of an object in two dimensions, the method comprising: providing a beam of light; illuminating a first beam deflector with said beam of light; controlling said first beam deflector to scan said beam of light to define a touch surface in space, said beam propagating parallel to said touch surface; receiving, at a second beam deflector laterally displaced from said first beam deflector, light scattered by an object in said touch surface; controlling said second beam deflector in tandem with said first beam deflector to provide a complementary deflection to said first beam deflector; determining a timing of said received light with reference to said scanning of said beam of light to determine an angular position of said object in said touch surface; imaging said scattered light from said second beam deflector onto a detector, in embodiments a longitudinal detector array; determining a location of said imaged scattered light using said detector (a location on said detector array) to determine a distance to said object in said touch surface; and determining said location of said object in two dimensions from said angular position and said distance.

As previously mentioned, the touch surface may be planar or some other shape defined by a scanning beam of light. The envelope of the scanned beam in effect defines the touch surface (which may have some thickness). In embodiments the touch surface is located adjacent a display surface, for example the surface of an electronic display screen such as an LCD display screen or a surface onto which an image is projected such as the surface of an interactive white board. The timing of the received light may be determined with respect to a reference beam direction identified, for example, by a photo detector. In embodiments the detector array is longitudinally aligned along a direction in which a spot of light scattered by a touch object moves as the touch object moves towards/away from the first beam deflector, that is along a direction of beam propagation. In embodiments this may be expressed as a direction parallel to a plane defined by the scanned beam of light at the location of the detector array (that is taking into account any folding or other optical manipulation by the imaging/receiving optics). As previously mentioned, in general the location of the object determined in two dimensions is not a precise location but has a probability distribution, more particularly an error in the determined distance which increases with distance of the object from the touch sensor. Again as previously mentioned, in embodiments of a method there is a fixed angle between the two beam deflectors (mirror facets) in, more particularly a plane having a normal aligned with the axis of rotation of the beam scanning.

In embodiments of the method the location of the imaged, scattered light is substantially inversely proportional to the distance from the object to a point defined by the locations of the beam deflectors.

Again, in embodiments of the method the scanned beam of light may be deflected to define a touch surface which is at an acute angle rather than perpendicular to a rotational axis of the scanning. The second beam deflector may the provide a complementary deflection although this is not essential as the detector array will in general be responsive to light scattered from a "slice" having some thickness in this Z-direction.

Again embodiments of the method include aligning the detector array at an angle to the optic axis of the imaging system to (at least partially) compensate for focus variations, recalling that objects at different distances focus at different locations on the detector array.

Embodiments of the method are particularly useful for detecting the location of a touch of an object or finger on or adjacent a physical surface and, in particular, for distinguishing between or disambiguating multiple simultaneous touches. Thus even approximate distances to locations of the touches may be used to uniquely associate respective angular positions from the same touch sensed with different touch sensors, to thereby determine an unambiguous touch location by triangulation (knowing the locations of the touch sensors and the distance between them).

In a related aspect the invention provides a system for determining the location of an object in two dimensions, the system comprising: means for providing a beam of light; means for illuminating a first beam deflector with said beam of light; means for controlling said first beam deflector to scan said beam of light to define a touch surface in space, said beam propagating parallel to said touch surface; means for receiving, at a second beam deflector laterally displaced from said first beam deflector, light scattered by an object in said touch surface; means for controlling said second beam deflector in tandem with said first beam deflector to provide a complementary deflection to said first beam deflector; means for determining a timing of said received light with reference to said scanning of said beam of light to determine an angular position of said object in said touch surface; means for imaging said scattered light from said second beam deflector onto a detector, in embodiments a longitudinal detector array; means for determining a location of said imaged scattered light using said detector to determine or distinguish a distance to said object in said touch surface; and means for determining said location of said object in two dimensions from said angular position and said distance.

BRIEF DESCRIPTION OF THE DRAWINGS

These and other aspects of the invention will now be further described, by way of example only, with reference to the accompanying figures in which.

DETAILED DESCRIPTION

Figure 1A:
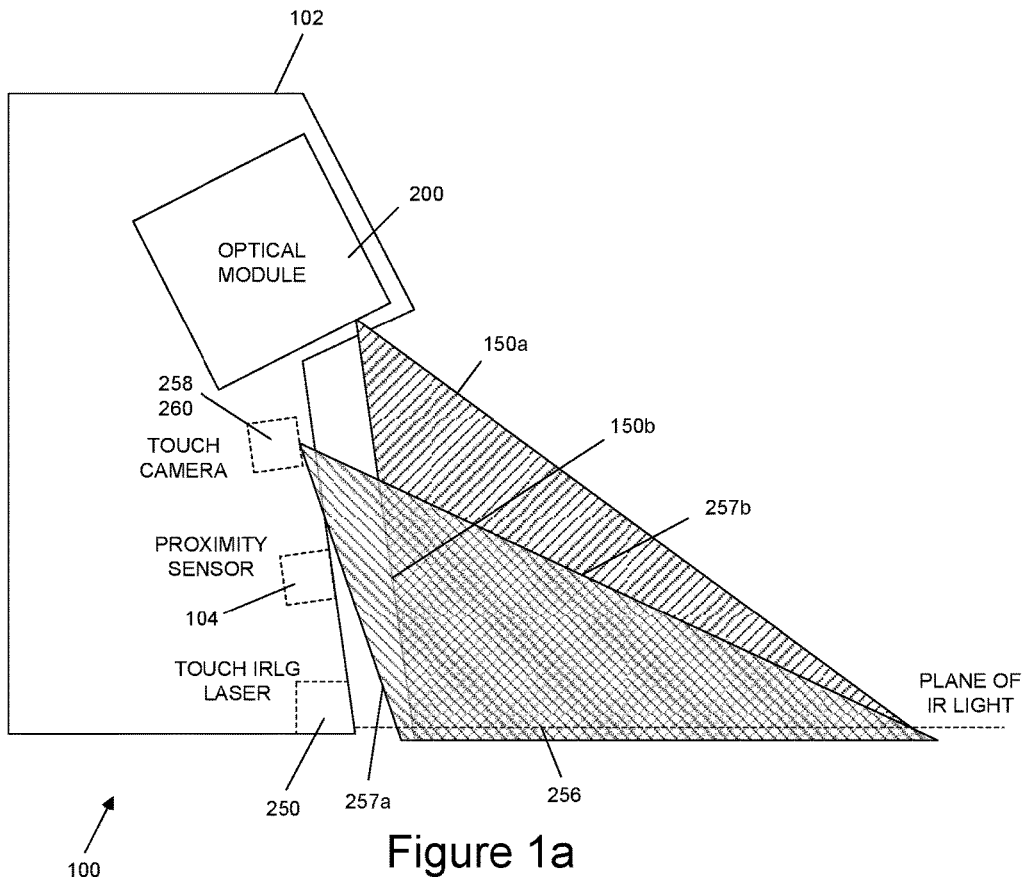
FIGS. 1a and 1b show, respectively, a vertical cross section view through an example touch sensitive image display device, and details of a sheet of light-based touch sensing system for the device.
Figure 1B:
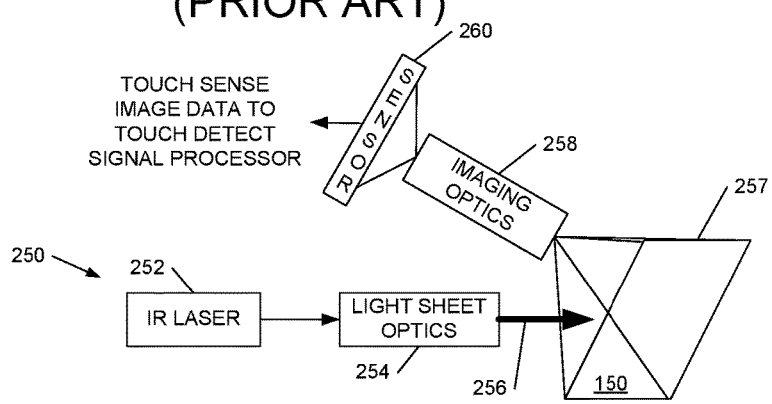
Figure 2A:
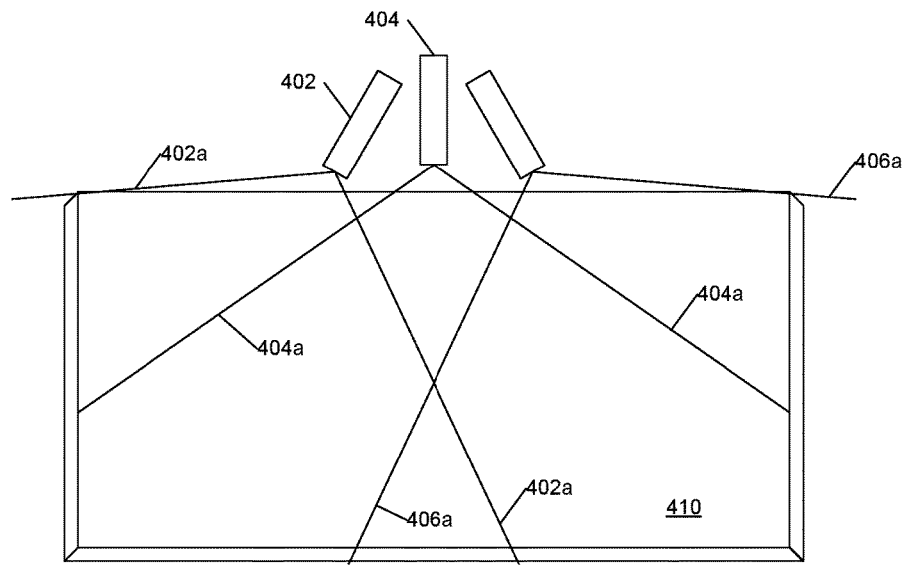
FIGS. 2a and 2b show, respectively, a plan view and a side view of an interactive whiteboard incorporating a touch sensitive image display.
Figure 2B:
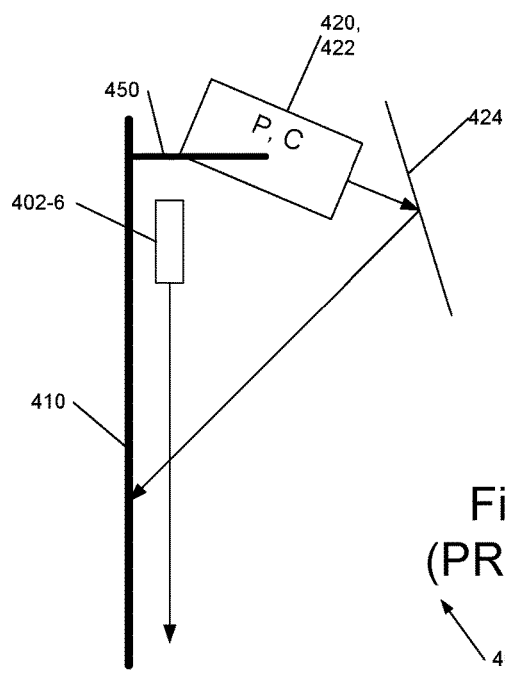

Broadly speaking we will describe touch detection systems based upon a scanning laser beam for detecting touches on, or proximate to, a surface. Thus referring to FIG. 3, this shows a touch sensing system 300 comprising a polygonal rotating scanning mirror 302 illuminated by a laser 304 followed by optional collimation optics 306 providing a collimated beam 308 of, for example, infrared light. Rotation of the polygonal scanner (mirror) 302 generates a scanned beam 310, the locus or envelope of the scanned beam defining a surface 312, typically a plane, for touch sensing. As illustrated, in a typical application this is located just above a display surface 314 such as a wall or white board onto which an image may be projected, a flat panel display, and the like. As the beam 310 scans through the touch surface 312, over the display surface 314, light 320 from one or more objects 318 on the surface, for example one or more fingers, is scattered back towards scanner 302. This light hits an adjacent face or facet 302b of the scanner to the face or facet 302a which directed the scanning beam, and reflects the scattered light through the same angle towards imaging optics 322 which image the scattered light onto a photodiode array 324 tilted with respect to an optical axis 322a of the imaging system. In one embodiment the photodiode array comprises a line of 16 sensors. The photodiode array provides light sensing signals to a bank of analogue-to-digital convertors 326 (or a multiplexed convertor) which in turn provides signals to a digital signal processor 328 which processes the photodiode array information in conjunction with timing data, to provide location data for object 318 as described in more detail later. The digital signal processor 328 may be implemented in hardware (circuitry), software, or a combination of the two.

A further photodetector 330 is directed towards the illumination face of the polygonal scanner 302 to allow measurement of the scanning angle at which the object 318 is detected. More particularly, photodetector 330 defines a reference direction 332 for scanning beam 310 and thus allows the scanning angle of the beam, θ, to be determined from the timing of the illumination of the photodiode array (knowing the rotation rate of scanner 302 or similar scan rate information). The skilled person will appreciate that a reference angle for scanner 302 may be determined in many different ways based on, for example, drive to and/or timing information from the scanner.

In an example embodiment with a six-sided polygonal scanner spinning at 10,000 rpm there are 60,000 faces or sweeps per minute, 1,000 sweeps per second. Data may be captured at, for example, a 1 KHz capture rate by a bank of 16 A/Ds, defining 1 Msamples/sec for DSP328 to process.

Figure 3:
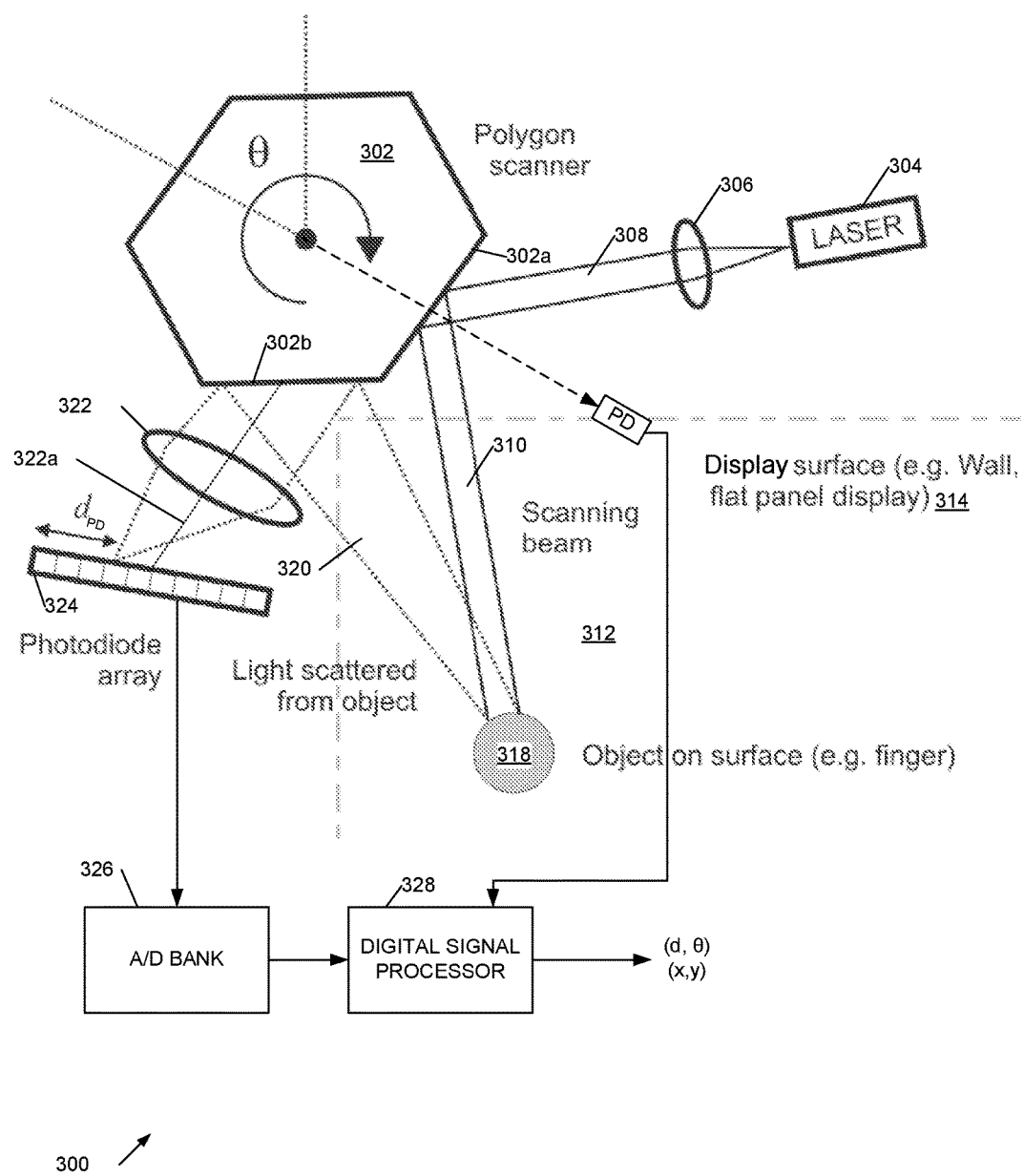
FIG. 3 shows a touch sensing system using a scanning laser beam and space-time object localization, according to an embodiment of the invention.

In FIG. 3 the optics and photodiode array are configured such that, in addition to the signal timing information from the scanner providing angular information θ, scatter from the touch object is re-imaged onto the surface of the photodiode array 324. With this arrangement the centroid position on the photodiode array, $d_{PD}$ provides information related to the distance between the intersection of the scanning beam 310 with the respective polygon face 302a, and the touch object in the touch surface 312. In embodiments the angle of the photodiode array to the optic axis 322a can be adjusted such that the position on the photo diode array is substantially inversely proportional to the distance along the scanning beam to the touch object. Thus the arrangement of FIG. 3 can provide 2D position information as the beam scans for one or multiple touch events in a touch surface, either in measured, polar co-ordinates (d, θ) or in real (x, y) space in the touch surface, optionally referenced to the display surface 314.

Although FIG. 3 illustrates an embodiment of the system employing a polygonal scanner 302, in alternative arrangements the rotating facets 302a, b of the scanner may be replaced by two synchronized MEMS (microelectromechanical system) scanners, one to scan the laser beam through the touch surface and the second to direct or 'scan' light scattered by a touch object onto the photodiode array 324. Employing MEMS scanning devices rather than a polygonal scanner can help to reduce the system size and acoustic noise. The MEMS scanners may be synchronized by providing a synchronized electronic drive to the scanners, for example employing a phased locked loop to keep the scanners at the same frequency, preferably a resonant frequency of the scanners, and in phase synchronization.

Figure 4A:
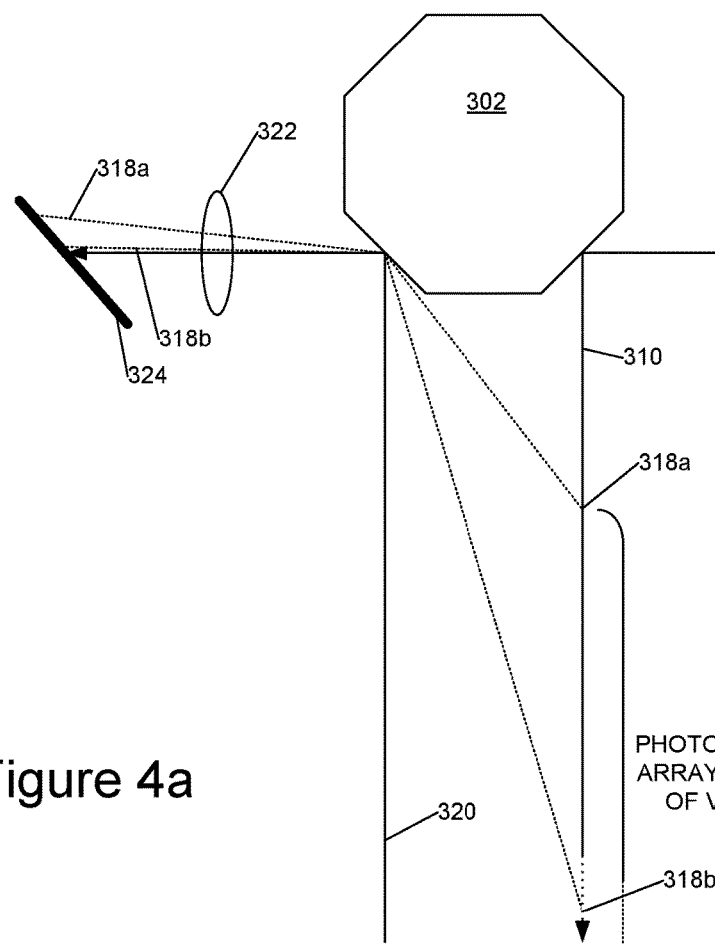
FIGS. 4a to 4d show, respectively, a schematic illustration of object distance perception in the system of FIG. 3, a first photodiode array field of view for the system, a flattened field of view for the system, and an example profile of a field flattening lens for the system.
Figure 4B:
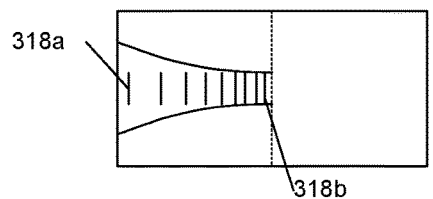
Figure 4C:
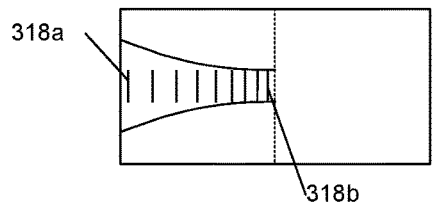

Turning next to FIG. 4a this shows a simplified, schematic illustration of a system of the type shown in FIG. 3 but with an octagonal scanner for the purpose of simplifying the explanation. Conceptually the scanning and return beams 310, 320 are scanned together by scanner 302, pointing in the same direction as the scanner rotates. However although the beams 'look' in the same direction, the return, 'imaging' beam is displaced to one side of the scanning beam and thus the imaging system, more particularly the photodiode array, sees the object at a different angle depending upon the distance of the object from the scanner. In effect the photodiode array images a one dimensional strip along the scanning beam starting at a closest observable object position, for example object position 318a, and extending towards infinity. FIG. 4b represents an approximation to the view 'scene' by the photodiode array, also illustrating that for regularly spaced object positions (vertical lines in the diagram) the spacing of these gets closer together as the object approaches infinity (the location approaches the centre of the photodiode array).

The illustration of FIG. 4b shows that the image of the object position on the photodiode array is asymmetric about the optical axis, effectively only using half of the image field, and the skilled person will appreciate that the photodiode array may be positioned to similarly cover half of the image field.

Effectively the imaging system images the line illuminated by the scanning beam and the direction in which the imaging system looks is arranged by the scanner to be the same as the scanning beam, thereby compensating for the change in beam direction as the beam is scanned. It is not essential, however, that this compensation is exact—in theory the scanning for the return, imaging beam could be omitted but the effect would be that the imaged line (photodiode array) would be extremely long because it would be imaging over the range of directions of the scanning beam. However it can be appreciated from this that if the scanning of the return, imaging beam did not precisely match or compensate for the beam scanning the effect would be to lengthen the photodiode array. The skilled person will appreciate that as the beam 310 scans, there is a point at which it intersects the touch object which flashes its radial position onto the photodiode array, rather in the manner of a lighthouse beam—that is the position of the image centroid on the photodiode array does not change substantially (and the imaging beam always looks with the same spatial offset to one side).

In embodiments, therefore, the scanning and imaging directions are swept together by a pair of mirrors which keeps the imaging system looking down the scanned direction. The number of mirror faces for a polygonal scanner may be varied according to the desired scan angle, fewer faces resulting in a larger scan angle. For a polygonal scanner the (maximum) scan angle is given by $$2\left(\frac{2\pi}{n}\right)$$

(where the factor of 2 arises because the mirror reflection effectively doubles the scanned angle).

Figure 4D:

By adjusting the acute angle of the longitudinal direction of photodiode ray 324 with a respect to the optical axis of the imaging system the relationship between the object distance along the scanning beam and the position on the photodiode array may be adjusted and, in embodiments, this may be arranged such that there is an approximate inverse proportionality between the touch object distance and the position of the imaged light scattered from the object (which may be an average or centroid position) on the photodiode array, $d_{PD}$. As illustrated in FIG. 4b, because a given change in object distance from the scanner far from the scanner (for example, at the bottom of a display screen) will result in a smaller displacement of the centroid on the photodiode array than the same change in distance closer to the scanner (for example at the top of a display screen) the accuracy of the distance determination decreases with increasing object distance from the scanner. One way to mitigate this reduction in accuracy is to employ an 'anti-fisheye' field flattening lens disposed between the scanner and the photodiode array, as part of the imaging system. FIG. 4d illustrates a vertical cross-section through such a lens illustrating that the lens has a small radius of curvature, and thus high magnification, near the optic axis, the radius of curvature (magnification) decreasing with increasing distance from the optic axis. This effectively magnifies the center of the field/regions near the optic axis more than the edge of the field (further from the optic axis), thus at least to a degree compensating for the reduction in accuracy of distance determination for longer distances. The skilled person will appreciate that a similar field flattening effect could be provided by a mirror, diffractive optical element, or in other ways. In effect the optical element is compensating for the smaller change in object angle when viewed from one side as the object distance increases by magnifying portions of the photodiode array field of view to at least partially compensate.

Referring again to FIG. 4b, this illustrates how a single detector rather than a detector array may be advantageously used in embodiments of the system. As a touch object, for example a finger, becomes more distant there can come a point at which the light reflected from the object is less than that of, say, a distant reflective surface such as a white wall. It can then be difficult to distinguish a touch event from the background. However FIG. 4b shows that by positioning just a single detector away from the position at which light from infinity is focused, to the left of the central location in the FIG. 4b example, a touch can be identified by its closer distance rather than relying solely upon the returned signal level. Thus some embodiments of a touch system may use a single detector rather than a detector array.

Figure 5A:
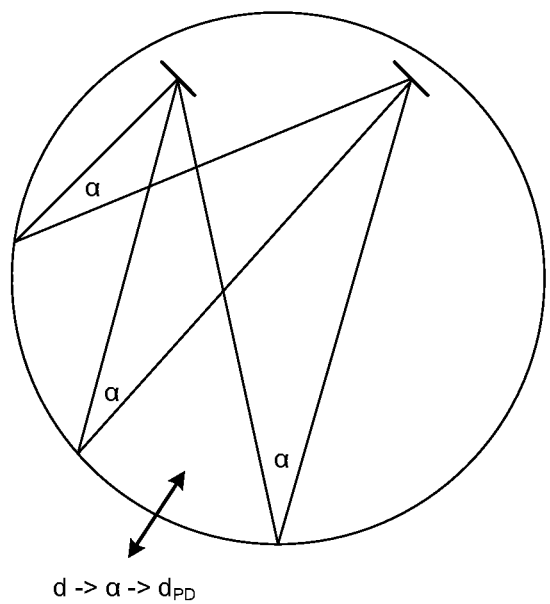
FIGS. 5a and 5b show, schematically, geometry of object distance perception for the system of FIG. 3.

Referring now to FIG. 5, this shows in more detail the geometry of the system of FIG. 3 and determination of the distance of an object 318 from the scanner. Thus FIG. 5a illustrates that for a constant angle α between the scanning and scattered beams 310, 320, the locus of the scattering object defines a circle the radius of which, in effect the distance of the object from the scanner, depends upon the angle α, which in turn maps to the location of the scattered light on the photodiode array, $d_{PD}$. Thus the angle α can be determined from $\alpha = f(d_{PD})$ where the function $f(\ )$ depends upon the optical imaging system (this may be determined analytically and/or by calibration for any particular system).

Figure 5B:
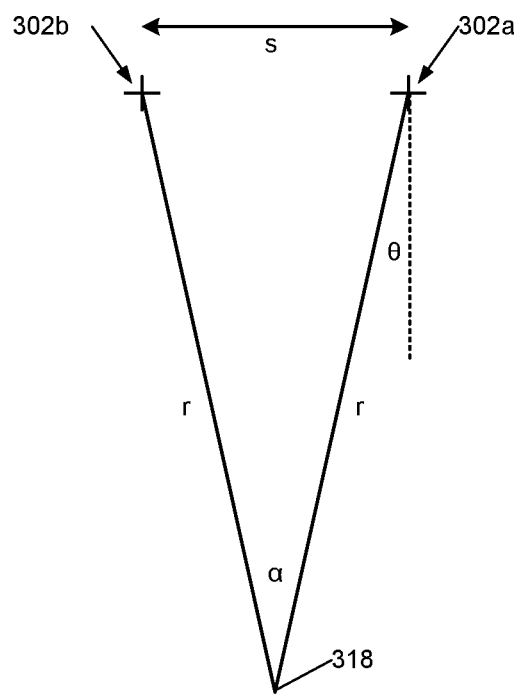

FIG. 5b shows the geometry for determination of the distance of the object 318 from the center of rotation of the polygonal scanner, which is approximately equal to the distance to object 318 along the scan beam from the point of reflection from the mirror facet. (FIGS. 5a and 5b are not to scale). Thus, $$r = s\frac{\cos(\theta + \alpha)}{\sin\alpha}$$

Where θ is the scanned angle and s is the distance between the points at which the scanning and scattered beams impinge on their respective mirror facets 302a, b (in practice the distance s varies slightly during operation as the point of intersection moves slightly as the mirror turns from one facet to the next). The distance r may be converted into rectangular coordinates as follows:

$x = r \sin \theta$ $y = r \cos \theta$

The angle θ is simply the rotational position of the scanner 302 (or an equivalent phase angle for a MEMS scanner).

Figure 6:
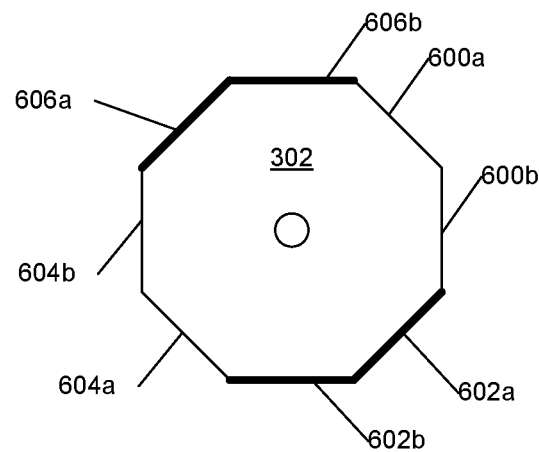
FIG. 6 shows an example of a polygonal mirror for the system of FIG. 1 configured to implement 3D object position detection.

FIG. 6 shows a variant of the scanner 302 in which adjacent pairs of facets 602a, b; 606a, b are provided with a wedge or other structure (such as a diffraction rating) to change the angle of the scanning beam away from the touch surface 312/display surface 314. In this way the pairs of facets 602, 606 define a second touch surface or plane at an angle to the first touch surface or plane, which allows sensing of objects further from display surface 314 to provide, for example, gesture recognition or a 'hover touch' capability. Other pairs of facets 600a, b; 604a, b direct the scanning beam within the first touch surface, as previously explained with reference to FIG. 3. As illustrated, both the scanning beam and the scattered beam are deflected by complementary wedge or other structures, but in principle only the scanning beam need be deflected if the photodiode array has sufficient 'vertical' imaging capability to capture the vertical offset. A similar situation is present where the scanning beam intersects an unmodified facet, say facet 600b, and the scattered beam a facet with a wedge structure, say facet 602a (or vice versa). Provided the photodiode array out-of-plane field of view is sufficient touch data may also be captured from these configurations of the scanner, thus ensuring that no scanning sweeps are lost (although the signal-to-noise ratio may diminish at such times). Alternatively the one-dimensional photodiode array may be replaced by a two-dimensional photodiode array, for example a camera. The skilled person will appreciate that the effect of wedges 602, 606 may straightforwardly be influenced by MEMS scanners in alternative embodiments.

Figure 7:
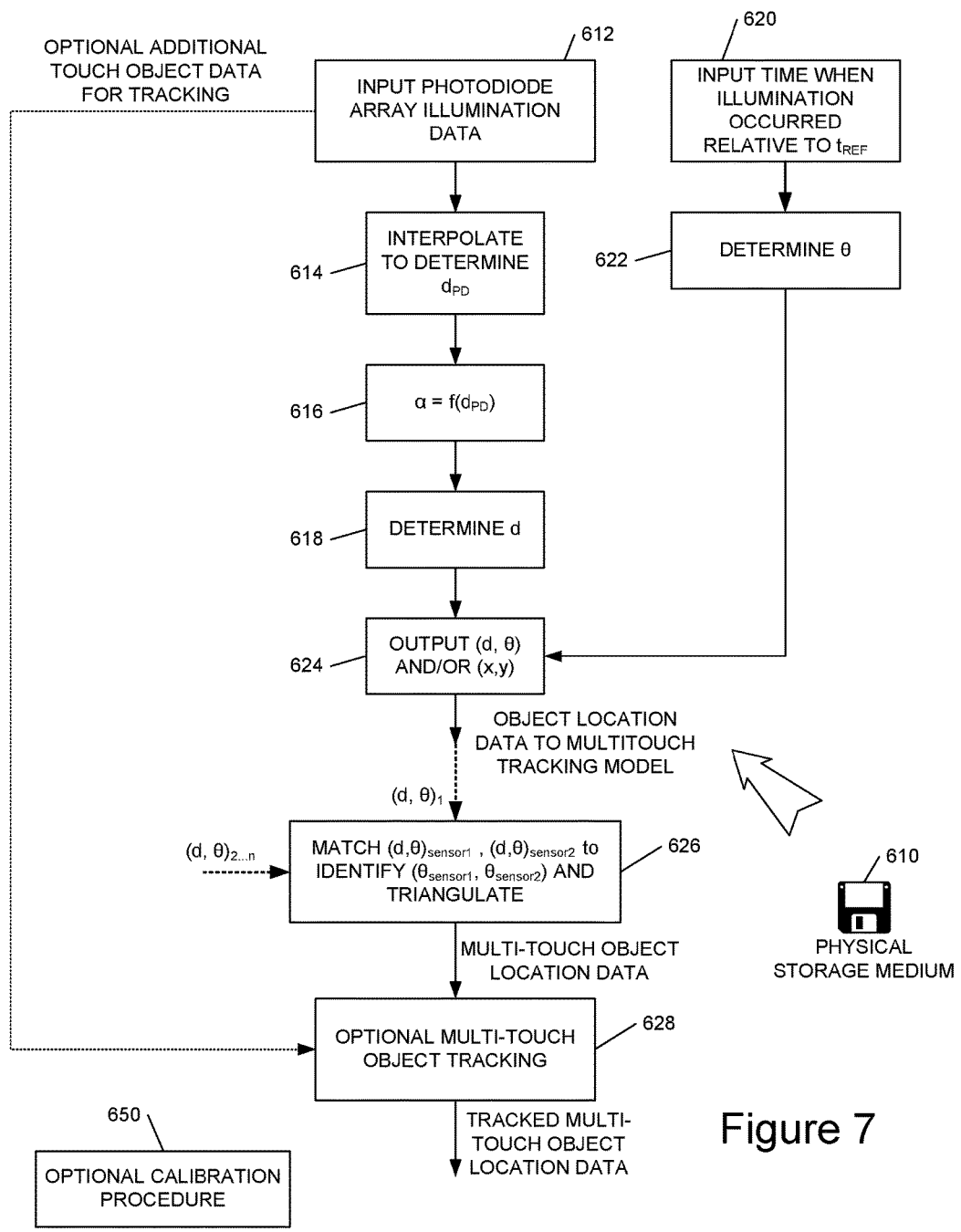
FIG. 7 shows a flow diagram of an object location procedure for the system of FIG. 3, including multi-touch processing steps.

FIG. 7 shows a flow diagram of a procedure for determining an object location using the system of FIG. 3, which may be implemented in software on a storage medium 610 and/or hardware in digital signal processor 328. Thus at step 612 the procedure inputs illumination data from photodiode array 324 and interpolates 614 this data to determine a centroid location of the illumination to determine the distance along the photodiode array $d_{PD}$ at which the centroid is located. The procedure then determines 616 the angle α between the scanning and scattered beams and from this determines the distance d (approximately r) along the scanned beam to the object (step 618) the timing 620 of the illumination of the photodiode array is determined relative to an angular reference point/time, which in turn determines 622 the angle of the scanning beam, and this is combined 624 with the distance information to output two-dimensional position information in either or both of polar and rectangular coordinates.

In a multitouch system this information provides two-dimensional position data for one touch object and this may be combined 626 with two-dimensional position information for one or more other touch objects to match corresponding positions in 2D using the approximate distance information, then determining accurate distance information by triangulation using the azimuth angle data from the scanning beam (timing). This multitouch 2D data may then optionally be tracked 628, for example using one or more tracking filters such as a Kalman filter to provide trapped multi-touch object location data. Optionally the tracking may employ additional data from the touch sensing system, for example photodiode array illumination duration data which may be employed to give an indication of the size of a touch object—a large object may indicate, for example, a pair of adjacent fingers; similarly a two peaked illumination pattern may indicate multiple objects. The size of an object as 'viewed' by the scanning beam may be determined from a knowledge of the beam width, angular velocity and illumination duration. Embodiments of the multi-touch object tracking may include tracking to provide continuity between touch locations where one touch object briefly occludes another in the scanning beam direction, then, for example, filling in by interpolation or extrapolation.

Figure 8:
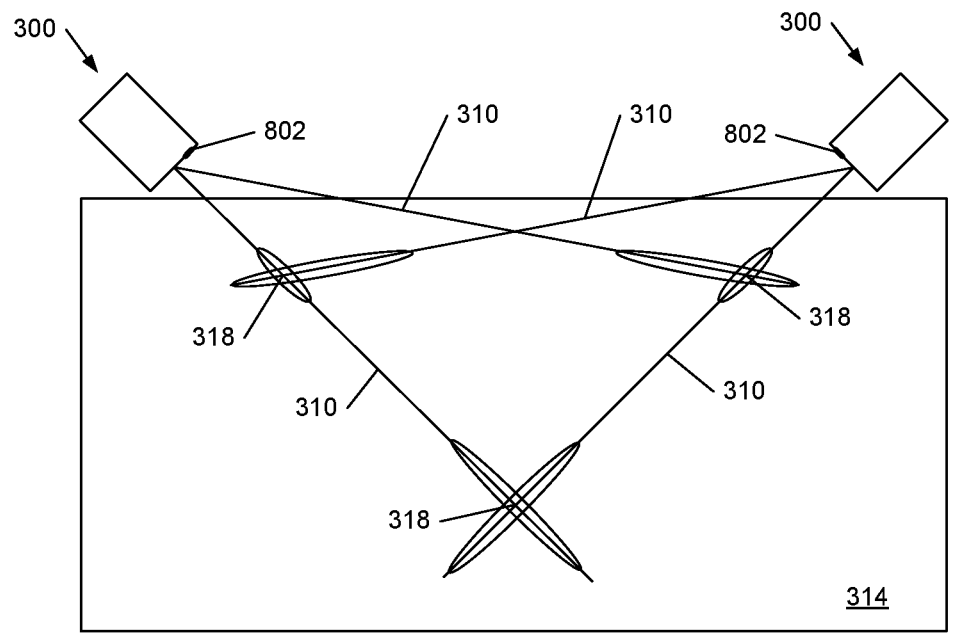
FIG. 8 shows an example of an interactive touch sensitive display incorporating a pair of touch sensing systems each as illustrated in FIG. 3, schematically illustrating multi-touch sensing.

FIG. 8 shows, schematically, a pair of sensing systems 300 of the type shown in FIG. 3 used to locate two simultaneous touch objects 318 where, without distance information, there would be ambiguity as to which touch was at which angle.

FIG. 8, illustrates, schematically, the display surface 314 of an interactive white board in which it is helpful to locate one of the touch sensing modules near the top left corner of the display surface and one near the top right corner, to help reduce the risk of occlusion when there are multiple touch objects. Further, since there is relatively low positional accuracy on a line directly between the touch sensing modules, these may be displaced laterally from the edge of the display surface so that touch events do not lie directly on a line between the modules.

In some cases, the signal processing includes a calibration procedure 650. In embodiments the location of a touch object is determined by calculation as previously described, and then a correction is applied to compensate for small errors, for example caused by errors in the positioning of the scanning mirrors and other misalignments. The correction may comprise, for example, an arbitrary polynomial mapping to a corrected position (x', y')←(x, y) or a translation/scaling/rotation, some other correction, for example to correct for a response of the imaging optics, to calibrate a rotation or scanning rate of the scanner, and the like. The calibration procedure may involve touching a known location in the touch surface. Optionally a calibration may be applied for each separate mirror facet by recording the calibration for each facet, identifying the facets by a fiducial mark or other coding on the scanner—this can help to correct for period variation in the detected location.

In some implementations the system may be self-calibrating/learning. Thus multiple modules may be placed on a surface and detect one another's respective positions in 2D, calibrating automatically by communicating this data between themselves. This may be facilitated by provision of a retro reflector 802 on a touch sensing module.

As previously mentioned, in translating a touch object along the scanning beam 310 (see, for example, FIG. 4*a*) the location of the image on the photodiode array 324 varies. Since the distance to the object also varies, the photodiode array 324 may be tilted so that the object is always substantially in focus. However it can be beneficial to have the object slightly out of focus as in this case the light from the object will illuminate a plurality of photo detectors of the array allowing a more accurate position to be determined for the centroid by interpolation and/or enabling fewer detector elements to be used. Although such defocus may be achieved by moving the photodiode array away from the location for best focus, it may be desirable to employ other defocusing techniques, for example a diffuser or other angular spread element, such as a relatively thick diffusing film, in the imaging optics.

In embodiments the photodiode 330 of FIG. 3 used to establish a reference angle/timing, may also be used for power saving and safety. For example the system may be shut down if the lack of a regular pulse at photodiode 330 is detected. Optionally the laser may be operated in a default, eye safe mode where the laser is operated at low power (or with a short duty cycle) only switching the laser fully on when scanning at full speed. Thus the laser may operate at reduced power during an initial spin-up phase. Additionally or alternatively the power or duty cycle of the laser may be reduced when there are no active touch events, to provide a reduced power standby mode. Additionally or alternatively the rotation rate of the scanner may be reduced at the same time. Optionally the laser may be pulsed on and off; more particularly the laser may be switched off during the transition between mirror facets (or in some similar portion of the cycle of a MEMS scanner) to provide a background illumination signal level from the photodiode array which may then be subtracted to reduce the background noise level.

Some implementations of the touch sensing system employ an infra red rather than a visible laser. Shorter wavelengths, for example 785 µm, may be desired for reduced cost, but longer wavelengths, for example 1.3 µm or longer may be desired for improved eye safety. Whichever wavelength is employed, embodiments of the system include a band pass filter, for example a narrow band interference filter, in the optical path prior to the photodiode array to select for the wavelength of the laser and reduce the ambient light signal.

As previously mentioned, to compensate for the effect of background light, in particular light at the laser wavelength, on the photodiode array the scanning laser may be pulsed on and off. Then during the off period a background reading from the photodiode array is taken and subtracted from subsequent readings when the scanning laser is active. This subtraction may be carried out in the analogue and/or digital signal processing domain.

In embodiments with a rotating mirror scanner it can be desirable to reduce the acoustic noise level. This can be achieved by, for example, employing air bearings rather than ball bearings and/or vacuum isolation and/or adaptive noise cancellation, and the like.

In embodiments of the system time-of-flight detection may be employed to provide additional accuracy. Thus with a pulsed laser the time of flight to the photo detector array may be employed for an additional measurement of distance to the one or more touch objects, and this additional distance information may be employed to augment that obtained from the offset on the photodiode array to provide improved two-dimensional position detection accuracy. In embodiments of such an approach sufficient accuracy may be obtained, depending upon the requirements of the touch system, by a single touch sensing module rather than the pair of modules illustrated in FIG. 8. Alternatively a combination of time-of-flight and/or triangulation and/or photodiode offset position measurements may be employed with multiple touch sensing modules. For example in an arrangement of the type shown in FIG. 8 time-of-flight may be employed for greater distances where the offset-based approach is less accurate, and triangulation for shorter distances, in this way providing better performance than either alone. The skilled person will appreciate, however, that the system at FIG. 3 may nonetheless provide sufficient 2D position accuracy on its own in some applications without the need for triangulation.

Touch sensing systems of the type we have described provide a number of advantages. They can be manufactured very inexpensively, even for systems covering a large LCD screen or interactive white board (a larger display simply requires a slightly higher power laser); they have a relatively low profile, for example less than 10 mm or less than 5 mm above the display surface or potentially even thinner, and can provide a high refresh rate, for example 200 Hz-1 Kz or greater. Further apart from small touch scanning modules positioned near the corners of the display surface no other hardware is required and, in particular, there is no need for a bezel around the display area.

Although we have described systems based on scanning mirrors and MEMS scanners in principle other types of scanning device, for example a diffractive optical element may be employed. However in this latter case the timing requirements make it desirable for the diffractive scanner to provide a comb of scanning beams rather than a single scanning beam.

No doubt many other effective alternatives will occur to the skilled person. It will be understood that the invention is not limited to the described embodiments and encompasses modifications apparent to those skilled in the art lying within the spirit and scope of the claims appended hereto.

What is claimed is:

1. A touch sensing system comprising:
    an optical beam source operable to provide an optical beam;
    controllable beam deflectors comprising at least first and second beam deflectors, wherein said first beam deflector is configured to deflect said optical beam through a first angle towards a touch sensing region, and wherein said second beam deflector is configured to deflect scattered light from an object in said touch sensing region through a second angle, and wherein the first and second beam deflectors move in tandem to scan the touch sensing region;
    a first detector configured to detect an angle corresponding to an angular position of the first and second beam deflectors;
    a second detector including a detector array, wherein a location on the detector array impinged by light deflected off the second beam deflector indicates a linear distance from the second beam deflector to the object; and
    a signal processor communicably coupled to:
        the second detector to receive a second detector signal indicating the linear distance,
        the first detector to receive a first detector signal indicating the angle, and wherein said signal processor is configured to process the first detector signal and the second detector signal to determine data defining a location of said object in said touch sensing region in two dimensions (2D).

2. A touch sensing system as claimed in 1 wherein said first and second beam deflectors are controlled such that, in a plane, there is a fixed angle between deflectors of said first and second beam deflectors.

3. A touch sensing system as claimed in claim 1 wherein said first and second beam deflectors comprise faces of a rotatable polygonal mirror.

4. A touch sensing system as claimed in claim 1 wherein said first and second beam deflectors comprise phase locked MEMS deflectors.

5. A touch sensing system as claimed in claim 1 wherein:
detector array is disposed at an acute angle to an optical axis of said imaging system to compensate a focus of said imaging system for variation in said distance of said object.

6. A touch sensing system as claimed in claim 1 wherein said imaging system is configured to produce a defocused image of said scattered light from said object on said detector array.

7. A touch sensing system as claimed in claim 1 wherein said imaging system comprises a field flattening optical element to preferentially magnify regions of a field of said imaging system close to an optical axis of said imaging system.

8. A touch sensing system as claimed in claim 1 wherein at least one of said beam deflectors is configured to deflect said beam of light into a plurality of different planes such that said touch sensing region is a three dimensional region.

9. A multitouch sensing system comprising a plurality of sensing systems each as claimed in claim 1, with overlapping said touch sensing regions, wherein said location in 2D comprises data defining said location in polar coordinates including a distance from a said beam deflector and a respective azimuthal angle, the multitouch sensing system further comprising a signal processor determine locations of said multiple touches from said respective azimuthal angles and to disambiguate multiple touches in said overlapping touch sensing regions responsive to said distances determined for said multiple touches.

10. A multitouch sensing system as claimed in claim 9 wherein each said touch sensing system is configured to determine the locations of the other touch sensing system(s), and to communicate respective locations of the other touch sensing system(s) to calibrate relative positions of said touch sensing systems.

11. A touch sensing system as recited in claim 1 wherein said optical beam source comprises a laser, further comprising a control system to reduce an average optical output from said laser when a speed of said scanning is reduced.

12. A touch sensing system comprising:
an optical beam source to provide an optical beam;
a pair of controllable beam deflectors comprising at least first and second beam deflectors, wherein said first beam deflector is configured to deflect said optical beam through a first angle towards a touch sensing region, wherein said second beam deflector is configured to deflect scattered light from an object in said touch sensing region through a second angle, and wherein the first and second beam deflectors are laterally displaced from one another, and wherein there is a fixed angle between the first and second beam deflectors;
a detector including a detector array; and
a signal processor, coupled to said detector array to receive an imaging signal defining a linear location, and having a timing input to receive a timing signal defining an angular position of said beam deflector, wherein said signal processor is configured to process said timing signal to determine an angular location of the object with respect to the detector array and wherein said signal processor is configured to process said linear location to determine a distance of said object from said detector array to thereby determine data defining a location of said object in said touch sensing region in two dimensions (2D);
an imaging system to image said deflected scattered light from said second beam deflector onto said detector; and
wherein said first and second beam deflectors are controlled in tandem to scan said touch sensing region.

13. A touch sensing system as claimed in 12 wherein said first and second beam deflectors are controlled such that, in a plane, there is a fixed angle between deflectors of said first and second beam deflectors.

14. A touch sensing system as claimed in claim 12 wherein said first and second beam deflectors comprise faces of a rotatable polygonal mirror.

15. A touch sensing system as claimed in claim 12 wherein said first and second beam deflectors comprise phase locked MEMS deflectors.

16. A touch sensing system as claimed in claim 12 wherein said detector comprises a detector array at an acute angle to an optical axis of said imaging system to compensate a focus of said imaging system for variation in said distance of said object.

17. A touch sensing system as claimed in claim 12 wherein said detector comprises a detector array, and wherein said imaging system is configured to produce a defocused image of said scattered light from said object on said detector array.

18. A touch sensing system as claimed in claim 12 wherein said imaging system comprises a field flattening optical element to preferentially magnify regions of a field of said imaging system close to an optical axis of said imaging system.

19. A touch sensing system as claimed in claim 12 wherein at least one of said beam deflectors is configured to deflect said beam of light into a plurality of different planes such that said touch sensing region is a three dimensional region.

20. A multitouch sensing system comprising a plurality of sensing systems each as claimed in claim 19, with overlapping said touch sensing regions, wherein said location in 2D comprises data defining said location in polar coordinates including a distance from a said beam deflector and a respective azimuthal angle, the multitouch sensing system further comprising a signal processor determine locations of said multiple touches from said respective azimuthal angles and to disambiguate multiple touches in said overlapping touch sensing regions responsive to said distances determined for said multiple touches.

21. A multitouch sensing system as claimed in claim 20 wherein each said touch sensing system is configured to determine the locations of the other touch sensing system(s), and to communicate respective locations of the other touch sensing system(s) to calibrate relative positions of said touch sensing systems.

* * * * *